United States Patent Office 3,505,389
Patented Apr. 7, 1970

3,505,389
4-AMINO-2,3,5,6-TETRACHLOROBENZOIC ACID AND DERIVATIVES THEREOF
Edward D. Weil, Yonkers, and Edwin Dorfman, Grand Island, N.Y., assignors to Hooker Chemical Corporation, Niagara Falls, N.Y., a corporation of New York
No Drawing. Continuation-in-part of application Ser. No. 231,296, Oct. 17, 1962. This application Aug. 18, 1966, Ser. No. 573,194
Int. Cl. C07c *101/72*
U.S. Cl. 260—471                    8 Claims

ABSTRACT OF THE DISCLOSURE 2,3,5,6-tetrahalo-benzoic acid or esters, salts, or amides, either substituted or unsubstituted, having an amino or amide radical on the 4-position, are new compounds, useful in controlling weed growth.

---

This is a continuation-in-part of Ser. No. 231,296, filed Oct. 17, 1962, now U.S. Patent 3,268,394, issued Aug. 23, 1966.

This invention relates to novel compounds for the control of plant growth, especially for the prevention of weed growth. The herbicidal compounds of this invention have the structure:

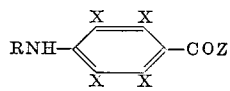

wherein R is hydrogen or acyl, said acyl being

wherein R′ is hydrogen, alkyl of 1 to 18 carbon atoms, preferably 1 to 12 carbon atoms, or alkenyl of 2 to 18 carbon atoms, preferably 2 to 12 carbon atoms, X is a halogen, preferably chlorine or bromine, and Z is —OH, —O-phenyl, —OY, —OM, —NH₂, —NHY, —NY₂,

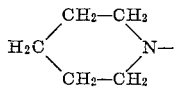

or

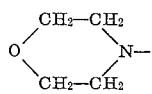

wherein Y is an aliphatic radical selected from the group consisting of alkyl and substituted alkyl of 1 to 18 carbon atoms, preferably of 1 to 12 carbon atoms, substituents being hydroxy or halogen, preferably chlorine or bromine, alkoxyalkyl and alkoxyalkoxyalkyl wherein alkyl is of 1 to 12 carbon atoms, alkenyl of 2 to 18 carbon atoms, preferably of 2 to 12 carbon atoms, and cyclohexyl, and M is ammonium, cyclohexylammonium, lower alkyl ammonium, N-methyl morpholinium, alkali metal or alkaline earth metal. For economic reasons, it is preferred to use chlorine as X.

Non-limiting examples of the compounds within the scope of the invention are: 4-amino-2,3,5,6-tetrachlorobenzoic acid, and its corresponding salts such as the sodium, potassium, lithium, ammonium, methylammonium, ethylammonium, isopropylammonium, butylammonium, octylammonium, dimethylammonium, diethylammonium, dipropylammonium, diamylammonium, dicyclohexylammonium, trimethylammonium, triethylammonium, N-methylmorpholinium, diethanolammonium, or other lower aliphatic ammonium salts, as well as calcium, iron, zinc and other heavy metal salts thereof; the lower alkyl esters of 4-amino-2,3,5,6-tetrachlorobenzoic acid such as methyl, ethyl, propyl, butyl, ethoxyethyl, octyl, methoxyethoxypropyl, cyclohexyl, phenyl, and 2-chloroethyl esters; the amide of 4-amino-2,3,5,6-tetrachlorobenzoic acid and the N-methyl, N-ethyl, N-propyl, N-butyl, N-octyl, N-ethoxyethyl, N-phenyl, N-cyclohexyl, N,N-dimethyl, N,N-diethyl, N,N-dipropyl, N,N-dibutyl, N,N-dioctyl, N,N - diallyl, N,N - dicyclohexyl, N-methyl - N - hydroxypropyl amides, and the piperidide and morpholide thereof; and 4-formylamino-2,3,5,6-tetrachlorobenzoic acid, 4 - acetylamino-2,3,5,6-tetrachlorobenzoic acid, 4-propionylamino - 2,3,5,6-tetrachlorobenzoic acid, 4 - isobutyrylamino - 2,3,5,6 - tetrachlorobenzoic acid and 4-methacrylylamino-2,3,5,6-tetrachlorobenzoic acid.

The preferred embodiments of the invention for reasons of special activity are the compounds previously characterized wherein R is hydrogen or acetyl, X is chlorine, and Z is methoxy, hydroxy, or —OM, wherein M is alkali metal, ammonium, or lower alkyl ammonium.

It is surprising and unexpected that these compounds exhibit useful herbicidal activity, because it has been heretofore thought that chlorobenzoic acids having a para-substituent are relatively inactive as herbicides and as plant growth regulators.

The 4-amino-2,3,5,6 - tetrahalobenzoic acids are prepared by the reduction of the corresponding 4-nitro-2,3,5,6-tetrahalobenzoic acids, utilizing one of several known ways of reducing nitro groups to amino groups such as catalytic hydrogenation, reduction with ferrous hydroxide, iron, or tin, and the like. The intermediate or starting 4-nitro-2,3,5,6-tetrahalobenzoic acid may be prepared by the nitration of 2,3,5,6-tetrahalobenzoic acid as hereinafter illustrated.

The esters and amides of the 4-amino-2,3,5,6-tetrahalobenzoic acid may be made directly from the 4-aminotetrahalobenzoic acid utilizing known methods, or, more conveniently, by conversion of the nitro intermediates to the ester or amide, followed by catalytic hydrogenation or chemical reduction thereof.

The chlorinated compounds of the invention may be employed in the pure form or admixed with relatively inactive o-aminotetrachloro isomers which are present when technical unpurified 2,3,5,6-tetrachlorobenzoic acid contaminated by 2,3,4,5-isomer is employed as a starting material in the nitration reaction. The o-aminotetrachloro isomer causes no harm and in some cases exerts a noticeable synergistic effect upon the activity of the p-aminochloro isomer. The compounds of the invention may be used in various formulations.

The herbicidal compositions of this invention may be used by themselves or may be incorporated into liquid or solid formulation, ranging from the very simple to the most elegant. For example, if it is desired, the compounds of the invention may be made the components of a liquid formulation by diluting, dispersing, dissolving or emulsifying with a surface active adjuvant or combination of adjuvants in water or in an organic solvent, such as petroleum hydrocarbon, alcohols, ketones, esters, glycols or combinataions thereof. Alternatively, the novel herbicides may be made up as solid formulations of powders, dusts, wettable dusts, granules and pellets, using solid diluents such as talc, clays, flours, starches, diatomaceous earths, mica, alkali earth limes, carbonates, and phosphates, either finely divided, granular or pelleted in form. These solid or liquid formulations facilitate handling and application and, sometimes, enhance herbicidal activity to more than an additive degree.

The liquid compositions, whether solutions, dispersions of the reactive agent in the liquid solvent, wettable powders or dust compositions, may contain as conditioning agents one or more surface active agents in amounts sufficient to render the composition readily dispersible in water. Within the term "surface active agent" are included wetting agents, dispersing agents, emulsifying agents, and the like. A satisfactory but not complete list of such agents is set forth in an article in "Soap & Chemical Specialties," vol. 31, No. 7, pages 50–61; No. 8, pages 48–61; No. 9, pages 52–67; and No. 10, pages 38–67 (1955). Other sources of adjuvant materials are set forth in Bulletin E–607 of the Bureau of Entomology and Plant Quarantine of the United States Department of Agriculture.

While the manner and method of application of the mentioned compositions are varied and dependent largely upon the climatic conditions, crop to be treated, weeds to be eradicated or the equipment available, a preferred embodiment of this invention is to apply the herbicidal compounds of the invention as sprays after making them up as liquid formulation comprised of several times their weight of non-phytotoxic solvent, such as xylene, with small amounts of emulsifier, such as a commercial polyoxyethylene ether, and a surfactant, such as alkylaryl sulfonate mixture. This type of mixture is emulsified with water and sprayed on the weed population growing amidst the desired crops such as corn, sugar cane, grapes, turf, grasses, etc., or alternatively, these compositions may be applied as solid formulations directly to the ground. The rate of application cannot be precisely stated due to varying degrees of resistance possessed by the weed species or crop, the stage of weed or crop growth, the soil type, and climatic conditions, but in general the rates will be at least one quarter of a pound of herbicide per acre and for reasons of cost will seldom exceed 100 pounds per acre, with the preferred range falling within one half to 50 pounds per acre. Where the weeds are at an early stage of growth, being more susceptible, they will frequently respond to rates from one half to 4 pounds per acre, while older weeds and weeds that are to be totally eradicated from the turf may require rates in excess of 4 pounds per acre. In these instances, where the weed population has been allowed to grow unchecked or where mature plants are encountered, application of up to 50 pounds per acre and even more may be required. For eradication of deeply rooted herbicide-resistant perennial weeds, such as field bindweed, rates of 10 to 100 pounds per acre are found best.

To illustrate the workings of this invention, representative non-limiting examples are hereinafter described. All parts are by weight, all temperatures are in degrees centigrade.

EXAMPLE 1

Preparation of 4-nitro-2,3,5,6-tetrachlorobenzoic acid

A reaction vessel, charged with 100 parts of 2,3,5,6-tetrachlorobenzoic acid, 200 parts of 98 percent sulfuric acid, and 400 parts of concentrated nitric acid having a specific gravity of 1.485, was heated at 85 degrees centigrade over a period of three and one-half hours. The mixture was then cooled to 15 degrees centigrade, filtered and the solid residue washed with water. Recrystallization from ethanol resulted in 98 parts of a pale yellow solid having a melting point of 229–230 degrees centigrade.

*Analysis.*—Calculated for $C_7HO_4NCl_4$: Nitrogen 4.6 percent, Neutralization equivalent 305. Found: Nitrogen 4.5 percent, Neutralizataion equivalent 305.

EXAMPLE 2

Preparation of 4-amino-2,3,5,6-tetrachlorobenzoic acid 10 parts of 4-nitro-2,3,5,6-tetrachlorobenzoic acid, "prepared by nitration of 2,3,5,6-tetrachlorobenzoic acid," in 100 parts of methanol was catalytically reduced with 3 parts of Raney nickel over a period of 19 hours at 30 pounds per square inch gauge pressure of hydrogen.

The solids were filtered out, treated with ammonium hydroxide to dissolve the product, the solution was filtered and the filter acidified. The precipitated product was filtered, recrystallized from methanol and water to obtain 5.2 grams of a product having a melting point of 195–196 degrees centigrade and a neutral equivalent of 275. The product was analyzed and found to contain 5.06 percent nitrogen and 50.11 percent chlorine. The theoretical amounts of these elements in $C_7H_3O_2NCl_4$ are: nitrogen—5.10 percent; and chlorine—51.7 percent.

EXAMPLE 3

Preparation of methyl 4-amino-2,3,5,6-tetrachlorobenzoate

A mixture of 100 parts of methyl 4-nitro-2,3,5,6-tetrachlorobenzoate, 1,425 parts of methanol and 2 parts of Raney nickel catalyst was stirred for 12 hours under 30 pounds per square inch gauge pressure of hydrogen. The catalyst was filtered, the solution evaporated and the residue recrystallized from ethanol to yield 75 parts of product having a melting point of 137–138 degrees centigrade. The product was analyzed and found to contain 54.4 percent of chlorine. The theoretical amount of chlorine in methyl 4-amino-2,3,5,6-tetrachlorobenzoate is 54.8 percent.

EXAMPLE 4

Preparation of ethyl 4-amino-2,3,5,6-tetrachlorobenzoate

A mixture of 8 parts of ethyl 4-nitro-2,3,5,6-tetrachlorobenzoate, 158 parts of acetone and 2 parts of Raney nickel was stirred for 12 hours under 30 pounds per square inch gauge pressure of hydrogen. The catalyst was filtered, the solution evaporated and the residue recrystallized from ethanol to yield 6 parts of product having a melting point of 148–150 degrees centigrade. The product was analyzed and found to contain 45.6 percent of chlorine. The theoretical amount of chlorine in ethyl 4-amino-2,3,5,6-tetrachlorobenzoate is 46.8 percent.

EXAMPLES 5–25

The following examples were conducted using the procedure of Example 4. The ester produced, reactants and reaction conditions are given in tabular form.

| Ex. | Reactant | Parts | Parts ethyl acetate | Parts methyl alcohol | Parts Raney nickel | Reaction time in hours | Hydrogen pressure, p.s.i.g.[1] | Product | Melting Point, °C.[2] | Percent Cl calculated | Percent Cl found |
|---|---|---|---|---|---|---|---|---|---|---|---|
| 5 | Butyl 4-nitro-2,3,5,6-tetrachlorobenzoate. | 8 | 180 | 79 | 2 | 12 | 30 | Butyl 4-amino-2,3,5,6-tetrachlorobenzoate. | | 42.8 | 40.8 |
| 6 | Isopropyl 4-nitro-2,3,5,6-tetrachlorobenzoate. | 7 | 270 | 79 | 2 | 12 | 30 | Isopropyl 4-amino-2,3,5,6-tetrachlorobenzoate. | 105–107 | 44.8 | 42.8 |
| 7 | Hydroxyethyl 4-nitro-2,3,5,6-tetrachlorobenzoate. | 7 | 180 | 79 | 2 | 12 | 30 | Hydroxyethyl 4-amino-2,3,5,6-tetrachlorobenzoate. | 143–145 | 44.6 | 43.0 |
| 8 | 2-ethylhexyl 4-nitro-2,3,5,6-tetrachlorobenzoate. | 7 | 270 | 158 | 2 | 12 | 30 | Ethylhexyl 4-amino-2,3,5,6-tetrachlorobenzoate. | | 36.7 | 35.1 |
| 9 | Phenyl 4-nitro-2,3,5,6-tetrachlorobenzoate. | 7 | 270 | 158 | 2 | 12 | 30 | Phenyl 4-amino-2,3,5,6-tetrachlorobenzoate. | 192–193 | 40.4 | 40.1 |
| 10 | Allyl 4-nitro-2,3,5,6-tetrachlorobenzoate. | 9 | 270 | 158 | 2 | 48 | 30 | Allyl 4-amino-2,3,5,6-tetrachlorobenzoate. | 135–136.5 | | |
| 11 | Bis-ethyl 4-nitro-2,3,5,6-tetrachlorobenzoate. | 20 | 180 | 237 | 2 | 60 | 30 | Bis-ethyl 4-amino-2,3,5,6-tetrachlorobenzoate. | | | |

| Ex. | Reactant | Parts | Parts ethyl acetate | Parts methyl alcohol | Parts Raney nickel | Reaction time in hours | Hydrogen pressure, p.s.i.g.[1] | Product | Melting Point, °C.[2] | Percent Cl calculated | Percent Cl found |
|---|---|---|---|---|---|---|---|---|---|---|---|
| 12 | 4-nitro-2,3,5,6-tetrachlorobenzamide. | 7 | 180 | 158 | 2 | 23 | 30 | 4-amino-2,3,5,6-tetrachlorobenzamide. | 247-248 | | |
| 13 | 4-nitro-2,3,5,6-tetrachlorobenzomorpholide. | 27 | 450 | 395 | 5 | 12 | 30 | 4-amino-2,3,5,6-tetrachlorobenzomorpholide. | | | |
| 14 | N-methyl 4-nitro-2,3,5,6-tetrachlorobenzamide. | 29 | 270 | 237 | 2 | 18 | 30 | N-methyl 4-amino-2,3,5,6-tetrachlorobenzamide. | 260-268 | | |
| 15 | N,N-dimethyl 4-nitro-2,3,5,6-tetrachlorobenzamide. | 27 | 270 | 237 | 2 | 18 | 30 | N,N-dimethyl 4-amino-2,3,5,6-tetrachlorobenzamide. | 198-200 | 47.0 | 46.8 |
| 16 | N-butyl 4-nitro-2,3,5,6-tetrachlorobenzamide. | 8 | 450 | 395 | 2 | 20 | 30 | N-butyl 4-amino-2,3,5,6-tetrachlorobenzamide. | 255-256 | 43.0 | 41.9 |
| 17 | N,N-diisopropyl 4-nitro-2,3,5,6-tetrachlorobenzamide. | 8 | 450 | 395 | 2 | 20 | 30 | N,N-diisopropyl 4-amino-2,3,5,6-tetrachlorobenzamide. | 138-140 | 39.8 | 41.6 |
| 18 | N-phenyl 4-nitro-2,3,5,6-tetrachlorobenzamide. | 7 | 450 | 158 | 2 | 12 | 30 | N-phenyl 4-amino-2,3,5,6-tetrachlorobenzamide. | 263-264.5 | 40.6 | 39.5 |
| 19 | N,N-diallyl 4-nitro-2,3,5,6-tetrachlorobenzamide. | 6 | 450 | | 2 | 12 | 30 | N,N-diallyl 4-amino-2,3,5,6-tetrachlorobenzamide. | 147-150 | 40.2 | 38.3 |
| 20 | N(3-chloro-4-methylphenyl)-4-nitro-2,3,5,6-tetrachlorobenzamide. | 6 | 450 | 237 | 3 | 12 | 30 | N(3-chloro-4-methylphenyl)-4-amino-2,3,5,6-tetrachlorobenzamide. | 280-280.5 | 44.6 | 43.6 |
| 21 | N-cyclohexyl 4-nitro-2,3,5,6-tetrachlorobenzamide. | 9 | 450 | [3] 790 | 2 | 12 | 30 | N-cyclohexyl 4-amino-2,3,5,6-tetrachlorobenzamide. | 232-233 | 39.7 | 38.8 |
| 22 | N-methyl-N-phenyl 4-nitro-2,3,5,6-tetrachlorobenzamide. | 3 | 180 | [3] 158 | 2 | 12 | 30 | N-methyl-N-phenyl-4-amino-2,3,5,6-tetrachlorobenzamide. | | 39.0 | 39.4 |
| 23 | N-isopropyl 4-nitro-2,3,5,6-tetrachlorobenzamide. | 29 | 270 | 237 | 2 | 12 | 30 | N-Isopropyl 4-amino-2,3,5,6-tetrachlorobenzamide. | 246-248 | 45.0 | 44.6 |
| 24 | N,N-dimethyl 4-nitro-2,3,5,6-tetrachlorobenzamide. | 27 | 90 | 79 | 2 | 24 | 30 | N,N-dimethyl 4-amino-2,3,5,6-tetrachlorobenzamide. | 190-192 | 43.1 | 42.8 |
| 25 | N,N-diisobutyl 4-nitro-2,3,5,6-tetrachlorobenzamide. | 30 | 180 | 79 | 2 | 25 | 30 | N,N-diisobutyl 4-amino-2,3,5,6-tetrachlorobenzamide. | 142-145 | 36.8 | 36.6 |

[1] Pounds per square inch gauge.  [2] Degrees Centigrade.  [3] Parts acetone.

EXAMPLE 26

Preparation of 4-acetylamino-2,3,5,6-tetrachlorobenzoic acid

A mixture containing 20 parts of 4-amino-2,3,5,6-tetrachlorobenzoic acid, 103 parts of acetic anhydride, 150 parts of acetic acid was refluxed for a period of six days. The solution was then freed of solvent under vacuum. The residue was crystallized from ethanol and the resulting product had a melting point of over 310 degrees centrigrade. The product was analyzed and found to contain 34.28 percent of chlorine and 4.6 percent of nitrogen. The theoretical amount of the elements in 4-acetylamino-2,3,5,6-tetrachlorobenzoic acid is: chlorine—34.1 percent; and nitrogen—4.4 percent.

EXAMPLE 27

Preparation of N,N-dimethyl-morpholino-2,3,5,6-tetrachlorobenzamide

A sealed tube containing 30 parts of N,N-dimethylpentachlorobenzamide and 40 parts of morpholine was heated for 31 hours at 140-160 degrees centigrade. The tube was then cooled, poured into water and the insoluble portion recrystallized from ethanol. A product having a melting point of 128-130 degrees centigrade was obtained. The product was analyzed and found to contain: 38.3 percent of chlorine and 7.49 percent of nitrogen. The theoretical amount of these elements in N,N-dimethylmorpholino-2,3,5,6-tetrachlorobenzamide is: chlorine—38.2 percent; and nitrogen—7.53 percent.

EXAMPLE 28

Preparation of N',N'-dimethyl-N,N-dimethylamino-2,3,5,6-tetrachlorobenzamide

A sealed tube containing a mixture of dimethylpentachlorobenzamide, 38 parts of dimethylamine and 5.5 parts of cuprous chloride was heated for 38 hours at 145-153 degrees centigrade. The reaction conversion was 96.5 percent. The tube was cooled and the excess dimethylamine evaporated. The product was extracted with ether. The product was analyzed and found to contain 44.9 percent of chlorine and 7.87 percent of nitrogen. The theoretical amount of these elements in the N',N'-dimethyl - N,N, - dimethylamino-2,3,5,6-tetrachlorobenzamide is: chlorine—43 percent; and nitrogen—8.49 percent.

Salts of this invention may be prepared by reacting the 4-amino-2,3,5,6-tetrahalobenzoic acid or acid derivative thereof with a hydroxy compound such as sodium hydroxide, potassium hydroxide, ammonium hydroxide, or the like.

EXAMPLE 29

To demonstrate the herbicidal effectiveness of the compounds of this invention, a series of test runs were conducted. Said tests consisted of applying severally the compounds listed in Table I as sprays to various plots of land previously seeded with mixed weeds, corn, cucumbers, millet, ryegrass, and sugar beets, at a rate of 2 to 8 pounds per acre. The mixed weeds were essentially completely prevented from emergence. Results are given in Table I.

TABLE I

| Compound | Rate, pounds per acre | Rating scale [1] |
|---|---|---|
| 4-amino-2,3,5,6-tetrachlorobenzoic acid | 2 and 4 | 8–10 |
| Allyl 4-amino-2,3,5,6-tetrachlorobenzoate | do | 10 |
| 4-acetylamino-2,3,5,6-tetrachlorobenzoic acid | do | 7–10 |
| Butyl 4-amino-2,3,5,6-tetrachlorobenzoate | do | 10 |
| Ethyl 4-amino-2,3,5,6-tetrachlorobenzoate | do | 5–10 |
| 2-ethylhexyl 4-amino-2,3,5,6-tetrachlorobenzoate | do | 10 |
| Hydroxyethyl 4-amino-2,3,5,6-tetrachlorobenzoate | do | 4–6 |
| Isopropyl 4-amino-2,3,5,6-tetrachlorobenzoate | do | 10 |
| Methyl 4-amino-2,3,5,6-tetrachlorobenzoate | 2 and 8 | 4–5 |

[1] Scale ranges from 0 to 10:
 0, indicating no discernible effect.
 1–3, indicating slight repression.
 4–6, indicating fair control.
 7–9, indicating good control.
 9–10, indicating excellent control.

From the foregoing description and examples, it will be apparent to those skilled in the art that various modifications are possible without departing from the scope of the invention and, therefore, said description and examples are not to be construed as limiting the invention except as defined by the appended claims.

What is claimed is:

1. A compound of the formula:

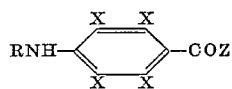

wherein R is hydrogen, X is a halogen selected from the group consisting of chlorine and bromine, and Z is selected from the group consisting of —OH, —O-phenyl, —OY, —OM, —NH₂, —NHY, —NY₂,

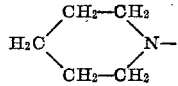

and

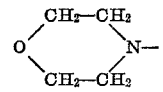

wherein Y is an aliphatic radical selected from the group consisting of alkyl, substituted alkyl, wherein the substituent is hydroxy or halogen, alkoxyalkyl, alkoxyalkoxyalkyl, alkenyl, and cyclohexyl, and M is selected from the group consisting of ammonium, cyclohexylammonium, lower alkylammonium, N-methyl morpholinium, alkali metal and alkaline earth metal.

2. A compound according to claim 1, wherein X is chlorine.

3. A compound according to claim 1, wherein Z is —OH.

4. A compound according to claim 3, wherein Z is —OM.

5. A compound according to claim 4, wherein M is alkali metal.

6. A compound according to claim 4, wherein M is ammonium.

7. The compound according to claim 1, 4-amino-2,3,5,6-tetrachlorobenzoic acid.

8. The compound according to claim 1, methyl 4-amino-2,3,5,6-tetrachlorobenzoate.

References Cited

UNITED STATES PATENTS 3,014,063  12/1961  McLane et al. ------ 260—518
3,100,226  8/1963  Raman et al. ------ 260—518

LORRAINE A. WEINBERGER, Primary Examiner

L. A. THAXTON, Assistant Examiner

U.S. Cl. X.R.

71—111, 114, 118; 260—247.2, 247.7, 294.7, 501.11, 518, 558